United States Patent
Congleton et al.

[11] Patent Number: 5,961,134
[45] Date of Patent: Oct. 5, 1999

[54] APPARATUS FOR HOUSING AND TRANSPORTING, AND FURNISHING AN ADJUSTABLE USER-PLATFORM FOR A PORTABLE COMPUTER

[75] Inventors: Jerome J. Congleton; Rebecca Congleton Boenigk, both of College Station, Tex.; Ronald Kemnitzer, Overland Park, Kans.; Kendall Belt, Bryan, Tex.

[73] Assignee: Neutral Posture Ergonomics, Bryan, Tex.

[21] Appl. No.: 08/819,701

[22] Filed: Mar. 12, 1997

[51] Int. Cl.⁶ ........................................... B62B 1/00
[52] U.S. Cl. .............................. 280/47.18; 280/37
[58] Field of Search .................. 280/37, 47.17, 280/47.18; 206/305, 536; 364/705.1, 708.1; 190/10, 11, 16, 107, 109, 111, 17, 18 A

[56] References Cited

U.S. PATENT DOCUMENTS

5,291,976  3/1994  Ku ........................................ 190/18 A
5,484,046  1/1996  Alper ..................................... 190/115

*Primary Examiner*—Robert J. Oberleitner
*Assistant Examiner*—C. T. Bartz
*Attorney, Agent, or Firm*—Arnold White & Durkee

[57] ABSTRACT

A portable computer workstation 100 contains a base portion 1010, a wheel system 350, 510 attached to the base portion 1010, and a transport member 150. The transport member 150 has a first end portion and a second portion. The first end portion of the transport member has a handle and the second end portion is coupled to the base portion 1010. The transport member 150 can be moved up and down from the base portion. The transport member 150 is used to pull the suitcase 150 and roll it about. The transport member 150 is also used to hold a tray upon which a portable computer 820 is secured and used. The computer workstation/suitcase 100 contains two sets of wheels 350, 510 on the base portion. One set of wheels 350, 510 is attached adjacent the other. Thus, the suitcase can be rolled in multiple directions. When the suitcase 100 is transformed into a computer workstation 100, several support members 330, 350 flare out from the base portion 1010. These support members 330, 350 provide additional support and stability for the computer workstation 100. Also, the computer workstation 100 provides the convenience of several computer peripherals such as, power connection extension cords 1130, phone line extension cables 1140, cellular phone, etc. The invention can be use as a suitcase 100, a transportable portable computer workstation 100, or both.

9 Claims, 11 Drawing Sheets

APPARATUS FOR HOUSING AND TRANSPORTING, AND FURNISHING AN ADJUSTABLE USER-PLATFORM FOR A PORTABLE COMPUTER

BACKGROUND OF THE INVENTION

1. Field of the Invention

The present invention relates generally to luggage, and more particularly to an apparatus for transporting a computer that is convertible to an adjustable, stationary stand.

2. Description of the Related Art

By virtue of advancing computer technology, portable computer usage has steadily increased and is now in the mainstream among computer users. Today's portable computers not only feature CPUs that are as powerful as the ones in desktop computers, but they also offer the same or equivalent input/output peripherals such as hard drives, modems, and CD-ROM drives. Due to the proliferation of portable computers, computer users now carry their computers virtually everywhere.

The freedom that portable computers provide also brings with it the need for ergonomic devices for carrying and using portable computers in remote locations. There are many types of office furniture available that are ergonomically designed for desktop computer usage, such as adjustable keyboard platforms, but the prior art does not offer such devices for portable computers. The prior art only provides a means of carrying portable computers. Even though comfortably carrying a computer is essential, computer users still need an ergonomic tool to actually use the portable computer in remote locations. To date, the prior art fails to provide computer users with a convenient platform on which to use the portable computer in removed settings.

Furthermore, the operating time allotted by the duration of the computer battery power is limited. Many circumstances, such as waiting in an airport, call for an extended period of computer usage that goes beyond the time that a battery can commonly provide. Therefore, for extended usage, the portable computer may require an additional power supply.

It is now routine for portable computers to be configured with telecommunication capabilities. Typically, telecommunications occur through a modem and telephone line. However, the prior art has not provided a convenient and easy-to-use connection between the modem and telephone line. The prior art does not offer a product that facilitates a comfortable means of transporting a portable computer, while also providing a stand that will independently support the computer at a proper height for use while standing or sitting, and allow for convenient power and modem access.

The present invention is directed to overcoming, or at least reducing the effects of, one or more of the problems set forth above.

SUMMARY OF THE INVENTION

In accordance with one aspect of the present invention, there is provided a portable computer workstation. The portable computer workstation is comprised of a base portion, a wheel system attached to the base portion, and a transport member having a first and second end portions. The first end portion of the transport member has a handle formed upon it. The second end portion of the transport member is coupled to the base portion. The transport member is movable between a first and a second position. The first position is where the handle of the transport member is adjacent to the base portion. The second position is where the handle of the transport member is spaced apart from the base portion. A tray is connected to the transport member such that the tray can move up and down the transport member. The tray is adapted to receive and secure a portable computer on the tray. The tray can be adjusted to be positioned where it is secured in the base portion or where it is secured at the top of the transport member, adjacent to the handle on the transport member.

In accordance with another aspect of the present invention, there is provided a portable container. The portable container is comprised of a base portion, a first wheel system, a second wheel system, and a transport member. The base portion has a plurality of walls arranged to form at least one enclosed compartment, and at least one of the walls is moveable to provide access to the interior of the compartment. The first wheel system is attached to the base portion adjacent to a first end portion. The first wheel system is disposed to permit rolling movement of the base portion in a first direction. The second wheel system is attached to the base portion adjacent the first end portion. The second wheel system is disposed to permit rolling movement of the base portion in a second direction. The transport member has both, a first end and a second end portion. The first end portion has a handle formed upon it. The second end portion is coupled to the base portion. The transport member is moveable between a first and second position where the handle is adjacent the base portion in the first position. The handle is spaced from the base portion in the second position the base portion in the second position.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF THE PREFERRED EMBODIMENTS

Illustrative embodiments of the invention are described below as they might be employed in the use of a suitcase that can be transformed into a computer workstation. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
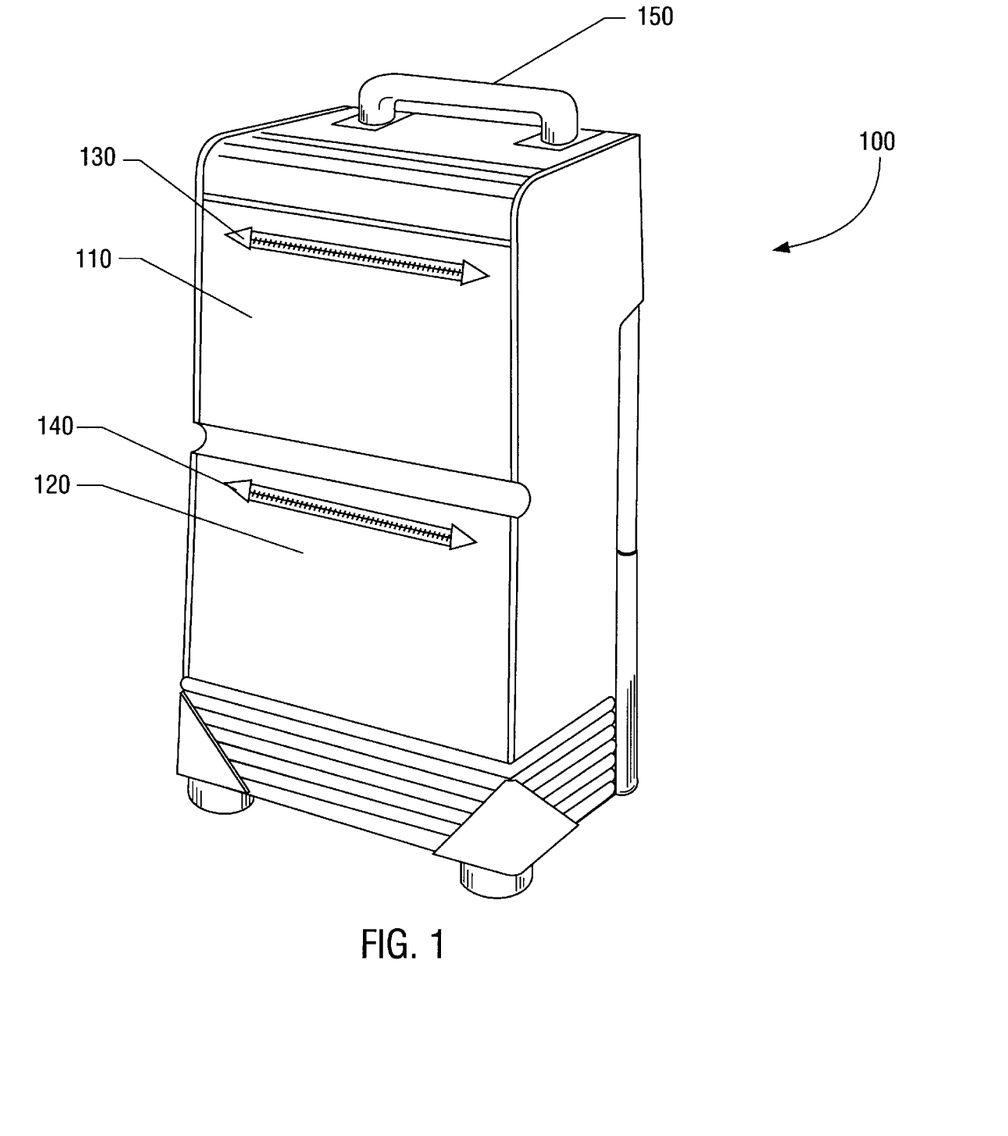
FIG. 1 illustrates an isometric front and side view of a suitcase in an upright position.

Turning now to the drawings and referring initially to FIG. 1, a rollable suitcase 100 is shown. The suitcase 100 includes a plurality of walls arranged to form an enclosed upper compartment 110 and an enclosed lower compartment 120. The upper compartment 110 is specially equipped to house a portable computer (not shown in FIG. 1). The lower compartment 120 is available for general luggage. The upper and lower compartments 110, 120 can be opened by using the upper and lower handles 130, 140, respectively. The suitcase 100 also contains an extensible transport member 150 that is shown completely retracted into the suitcase 100, but can be extended and used as a handle during rolling movement of the suitcase 100.

Figure 2:
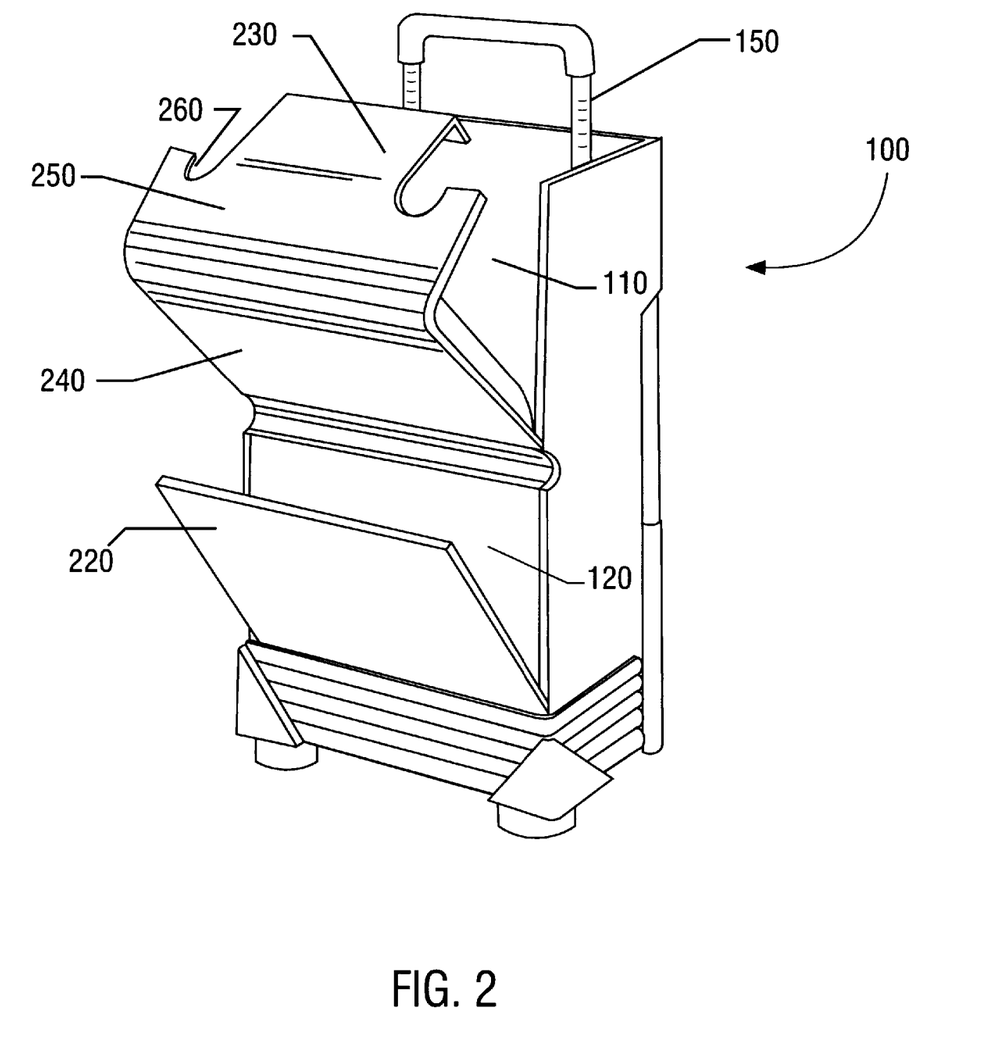
FIG. 2 illustrates an isometric front and side view the suitcase with its compartments opened.

FIG. 2 illustrates the suitcase 100 with a top compartment-cover 210 and a bottom compartment-cover 220. The compartments 110, 120 can be accessed separately. The compartment-covers 210, 220 are shown in an open position. A compartment restraint 230 prevents the compartment-cover 210 from falling below an adjustable set point. The top compartment-cover 210 is shaped differently from the bottom compartment 220. The bottom compartment-cover 220 is rectangular in shape. The top compartment-cover 210 consists of a side wall 240 and a top portion 250, with two notches 260 formed therein. The purpose of the notches 260 is to accommodate the extensible transport member 150.

Figure 3:
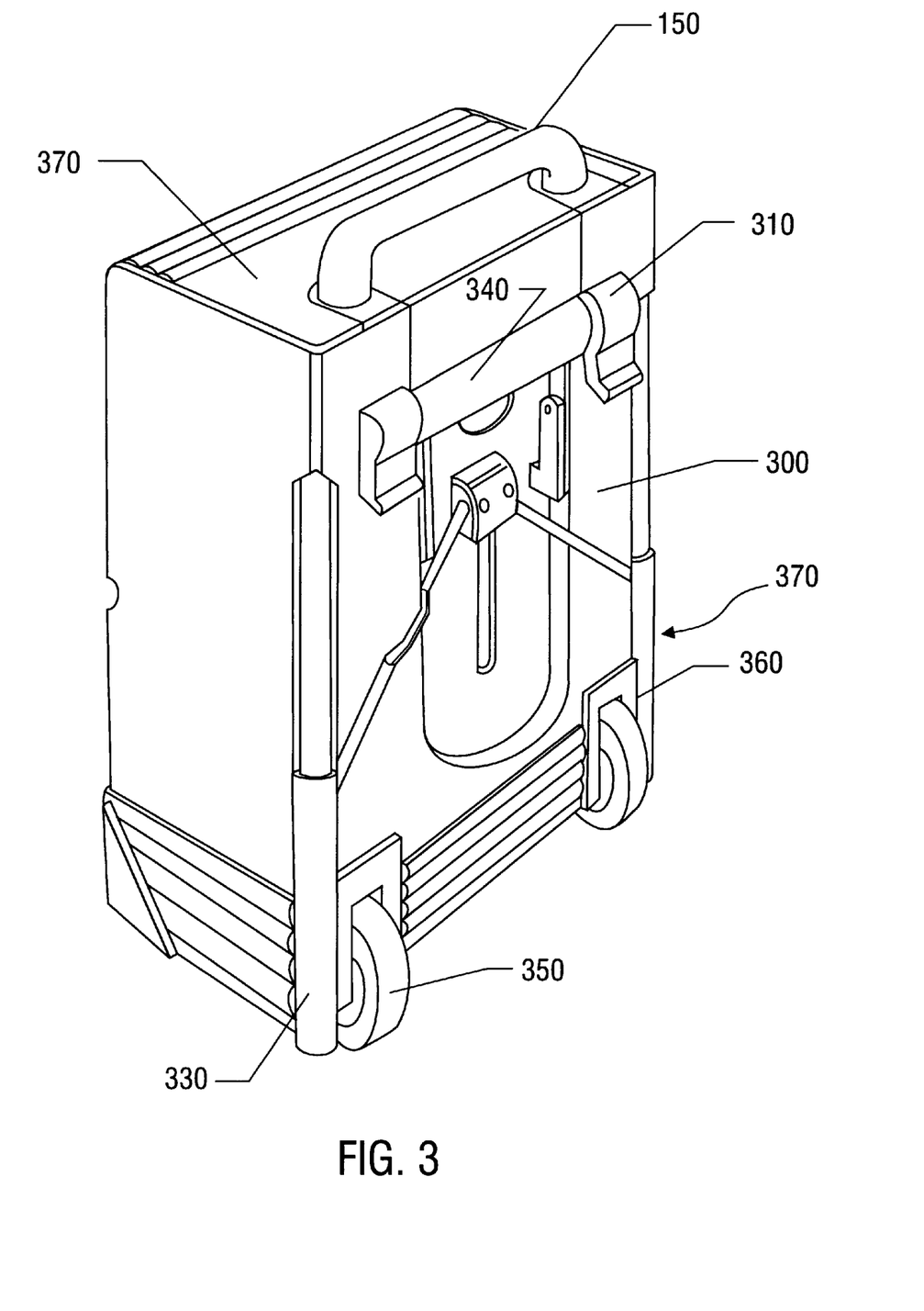
FIG. 3 illustrates an isometric rear side view of the suitcase.

A rear side 300 of the suitcase 100 is shown in FIG. 3. The rear side 300 of the suitcase 100 a locking mechanism 310 for the extensible transport member 150. As is described hereafter in greater detail in conjunction with FIG. 4, the locking mechanism 310 is pivotably engageable with the extensible transport member 150 so that the support 150 can be locked in an extended position. The rear side 300 of the suitcase 100 also contains support members 330. The support members 330, 360 are used for stabilization when the suitcase 100 is transformed into a computer workstation.

FIG. 3 also illustrates a footrest 340, which is connected to the support members 330, 360. As is described hereafter in conjunction with FIG. 11, the footrest 340 and the support members 330 are operably connected together and deployable by pivotal movement of the footrest 340 to provide an extended, stabilized, and comfortable base during operation of the portable computer. That is, the suitcase 100 has a footprint of a first pre-selected size when the support members 330, 360 are retracted and a second larger size when the support members 330, 360 are extended. Also, a pair of rear wheels 350 of the suitcase 100 are shown positioned adjacent a lower portion 370 of the rear side 300. The rear wheels 350 facilitate movement of the suitcase 100 by tipping a top portion 370 of the suitcase 100 in a direction toward the rear side 300 so that the suitcase 100 is primarily supported by the wheels 350. The interaction between the elements of FIG. 3 is describe in further detail below.

Figure 4:
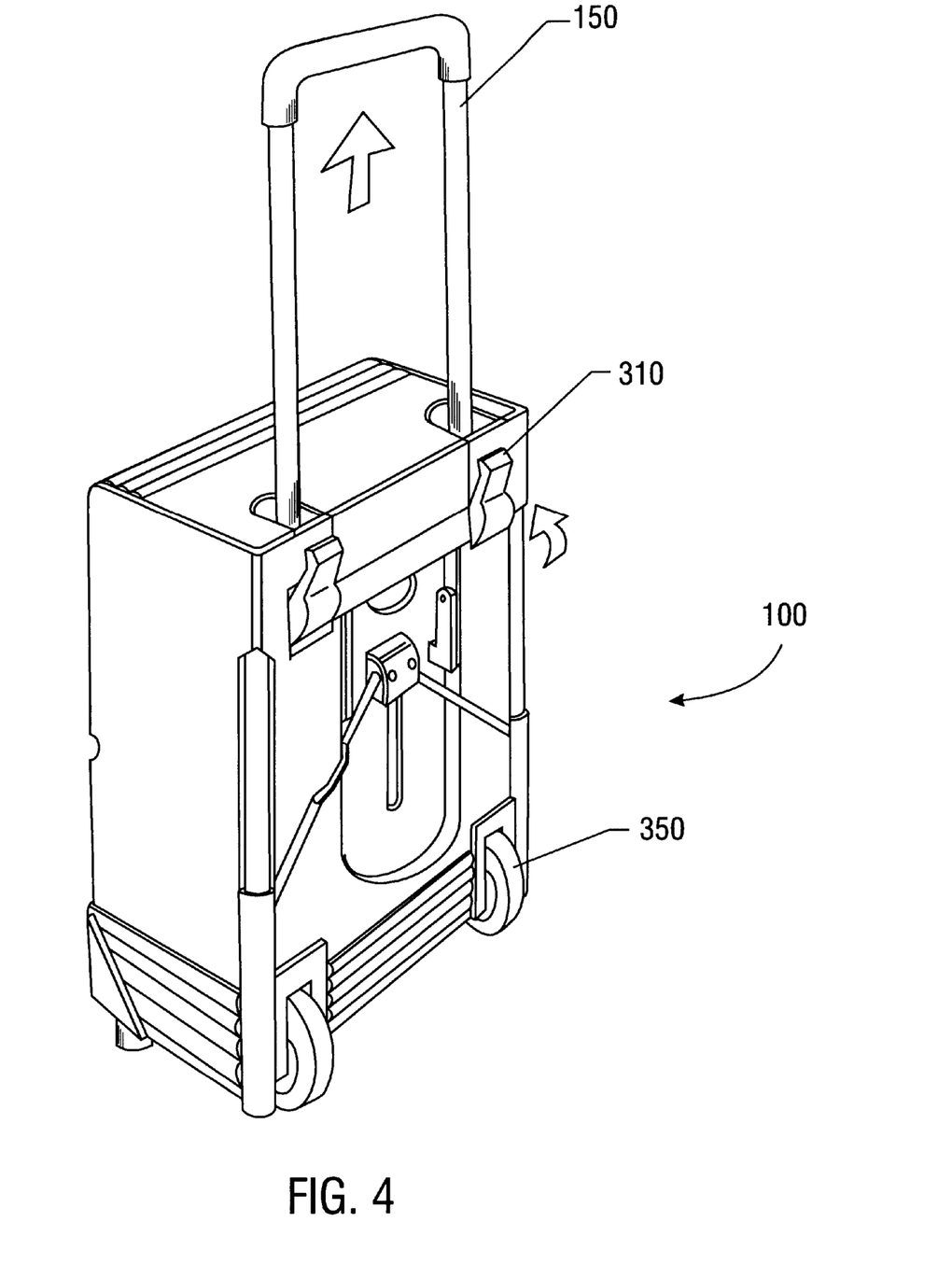
FIG. 4 illustrates the isometric view of the rear side of the suitcase with an extensible transport member shown in a expanded position.

The suitcase 100 is preferably transported using the configuration shown in FIG. 4. The support 150 is extended from its retracted position to a preferred height by pulling the support 150 in a direction generally away from the suitcase 100. The extensible transport member 150 is then locked into place by the locking mechanism 310. The suitcase 100 can be rolled on the wheels 350 by tilting the suitcase 100 backwards and pulling on the extensible transport member 150.

Figure 5:
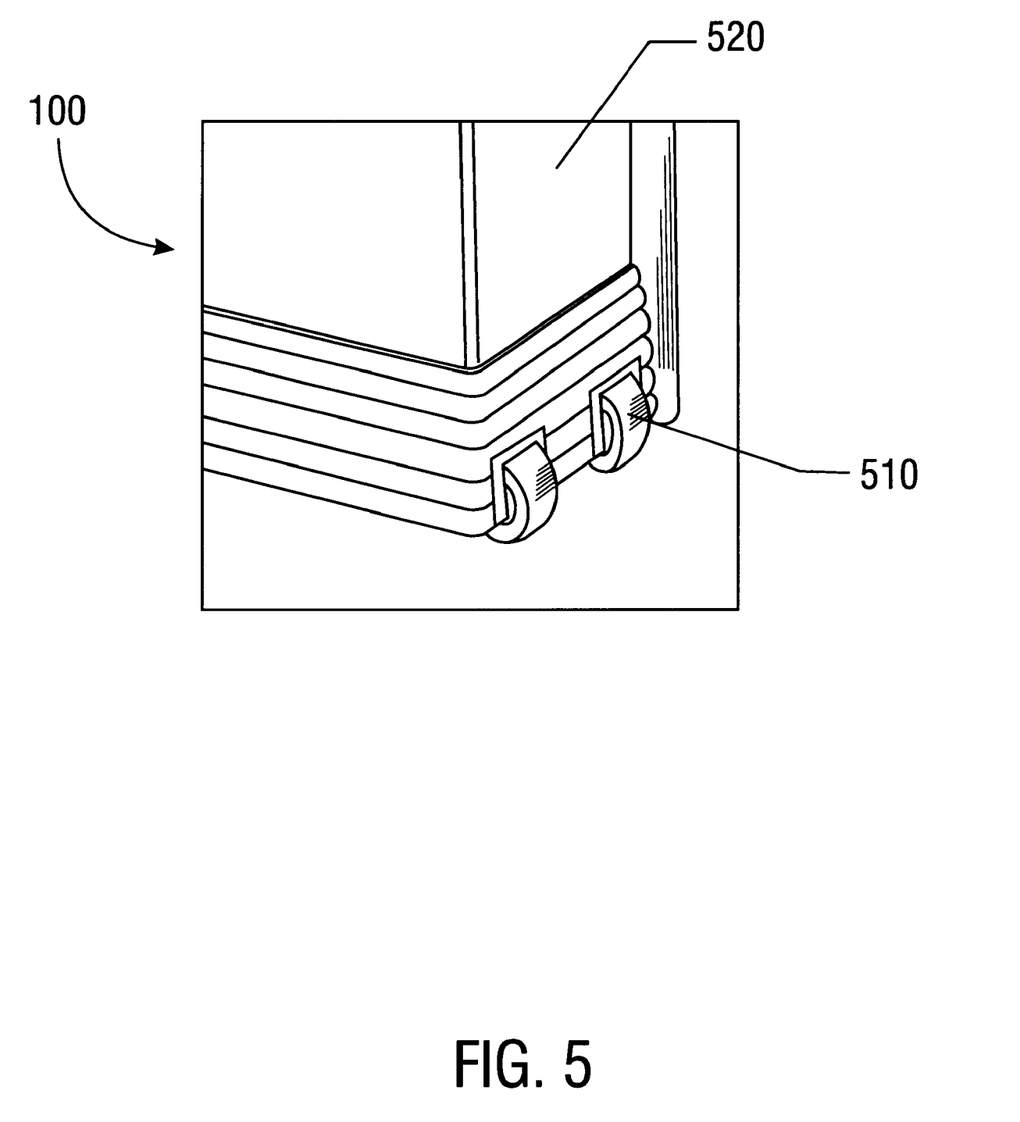
FIG. 5 illustrates a partial isometric front and side view of the suitcase with a pair of side wheels arranged to provide an alternate means of rolling the suitcase.

Alternatively, the suitcase 100 can also be rolled from a second position by using the configuration shown in FIG. 5. A pair of wheels 510 are rollably coupled to a side 520 of the suitcase 100. By tilting the suitcase 100 sideways, it can be rolled in a direction perpendicular to the direction rolled when the rear wheels 350 from FIG. 4 are used. Thus, the suitcase 100 is two-way rollable. Being two-way rollable is particularly advantageous in situations where a pathway is constrained, such as in the aisle of an airplane. Since the side dimensions of the suitcase 100 is substantially smaller than the front and rear dimensions, the suitcase 100 can be rolled down a relatively narrow aisle using the side rollers 510.

Figure 6:
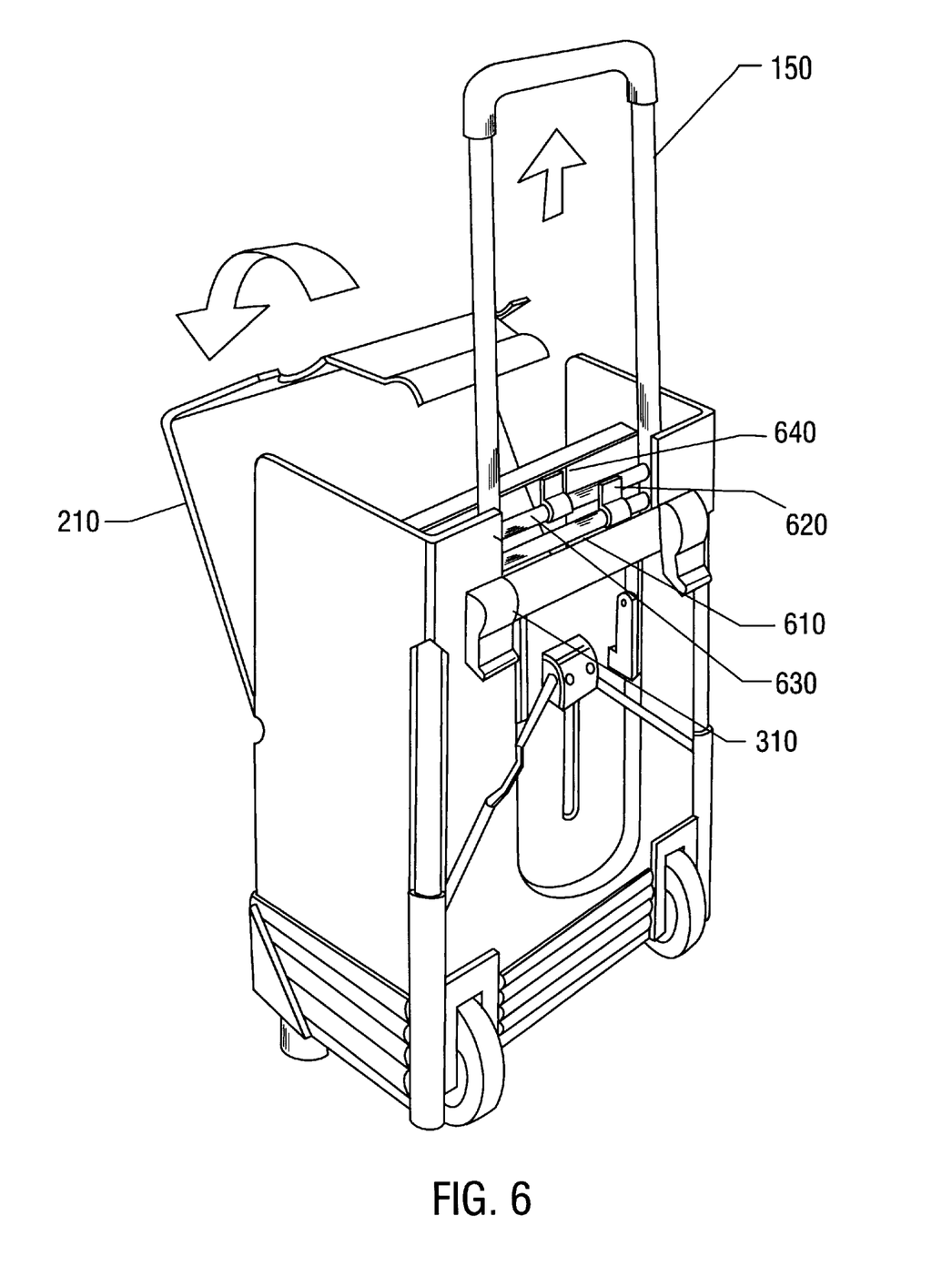
FIG. 6 illustrates an isometric rear and side view of the suitcase with the top compartment shown in an opened configuration.

As shown and discussed with respect to FIGS. 6–10, the suitcase 100 can be converted into a computer workstation. To transform the suitcase 100 into a computer workstation, the extensible transport member 150 is retracted upwards. Once the extensible transport member 150 is retracted, the top compartment-cover 210 is opened as shown in FIG. 6. At this point the portable computer, which is stored in the suitcase 100, can be brought out.

FIG. 6 also illustrates several locking mechanisms for converting the suitcase 100 into a computer workstation. The unlocking of the locking mechanism 310 for the extensible transport member 150 allows the member 150 to be moved from its initially retracted or its maximum extended position. The extensible member cylinder lock 610 is used to lock the extensible transport member 150 in place at any desired height between its initially retracted position and its maximum extended position. Finally, the computer tray cylinder lock 630 is used to lock the computer tray 810 into place once it is deployed (discussed in detail below). The cylinder locks 610, 630 are engaged and disengaged by manipulating the cylinder lock tabs 620, 640 that are attached on the cylinder locks 610, 630.

Figure 7:
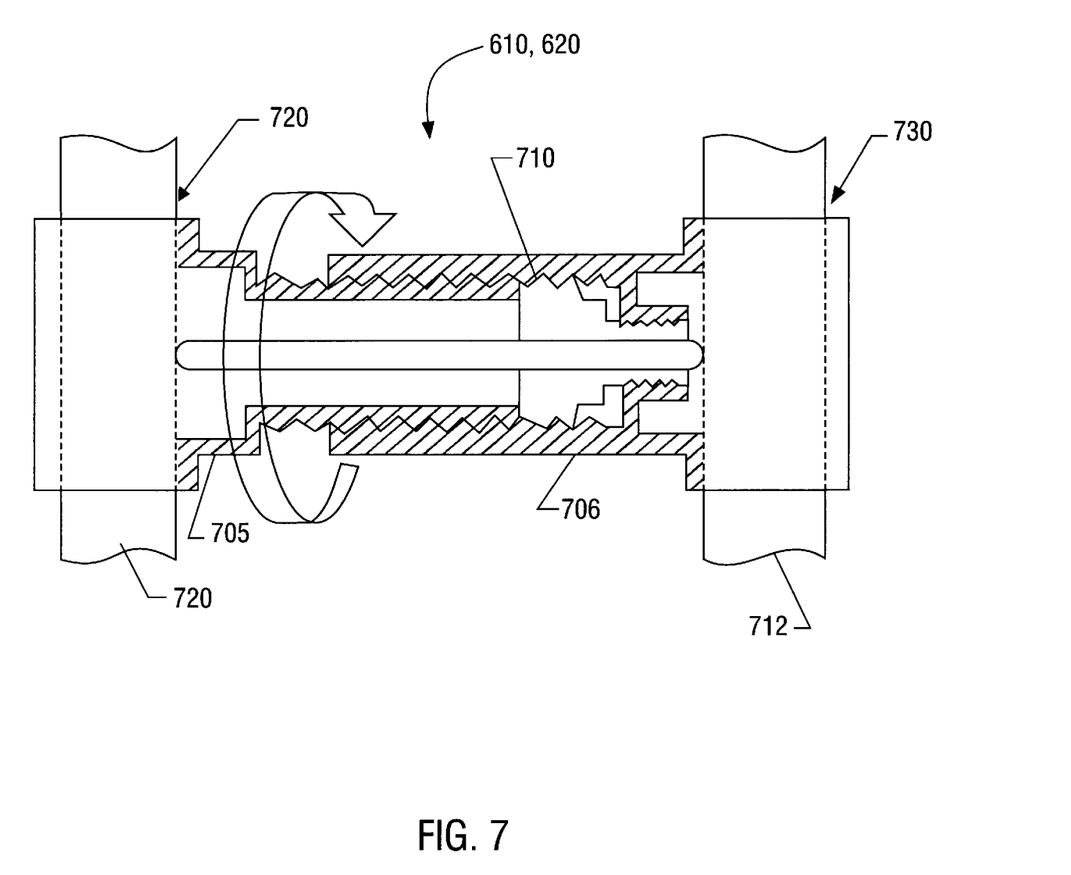
FIG. 7 illustrates a cross-sectional view of the cylindrical locks that are used to lock the extensible transport member and the computer tray in a desired position.

FIG. 7 illustrates a cross-section view of the cylinder locks 610, 620. The locks 610, 620 include a first and second housing 705, 706 coupled together at a threaded joint 710. Each housing 705, 706 extends over and captures within its end portions 720, 730 one of a pair of separated tubes 711, 712 that form the transport member 150. A pin 740 extends through the housings 705, 706 and into contact with the outer walls of the tubes 711, 712. The action of turning the cylinder lock tabs 620, 640 rotates the threaded joints 710 causing the ends 720, 730 to move towards each other. When the ends 720, 730 move towards each other, the tubes 711, 712 are pulled toward one another against the pin 740, creating a friction force on the tubes 711, 712, which results in the locking of the extensible transport member 150 or the computer tray 810. Once the extensible transport member 150 is adjusted to a desired height, the computer tray 810 is ready to be deployed.

Figure 8:
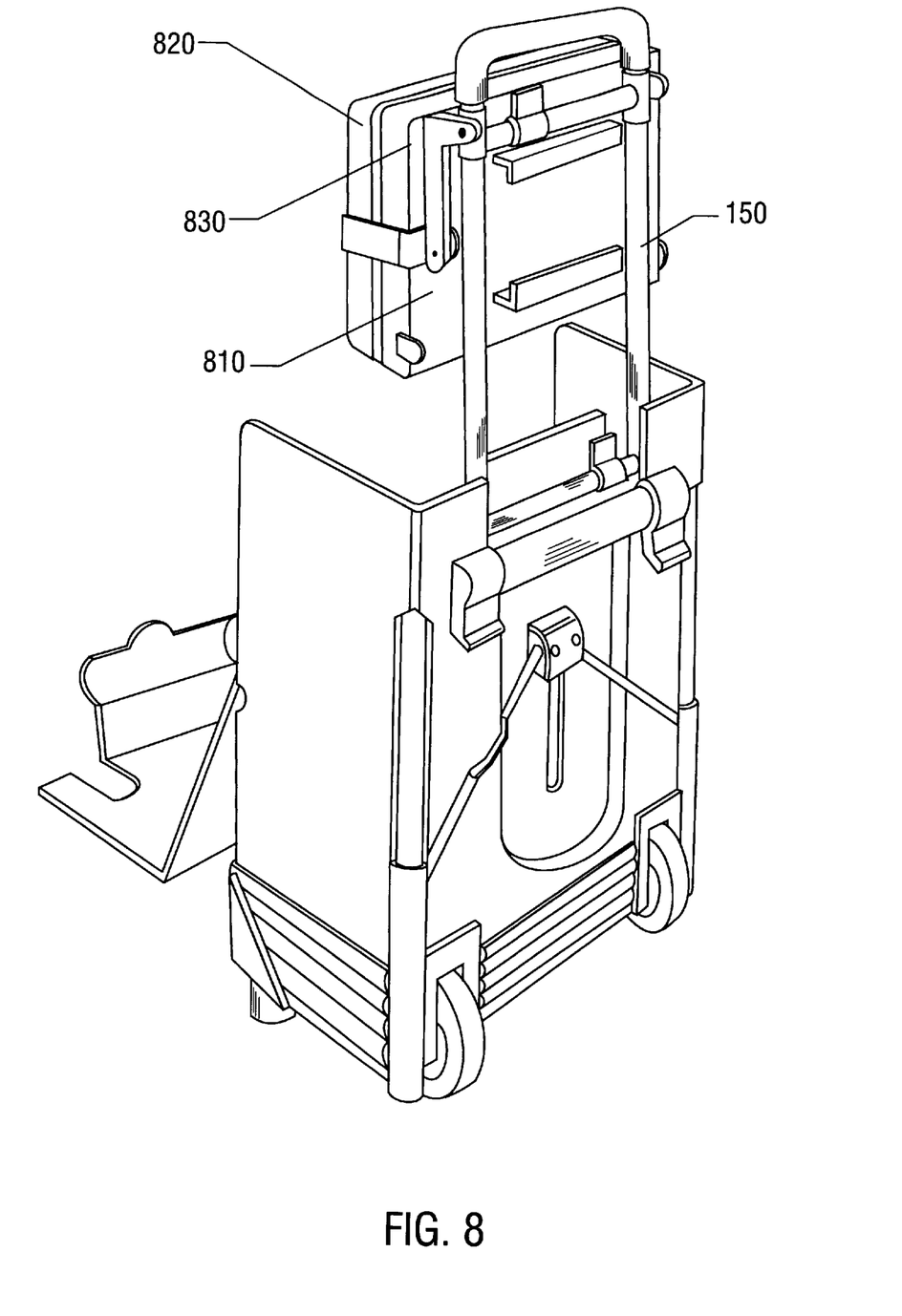
FIG. 8 illustrates an isometric rear and side view of the suitcase with a portable computer attached to a tray slideably arranged on the extensible transport member.
Figure 9:
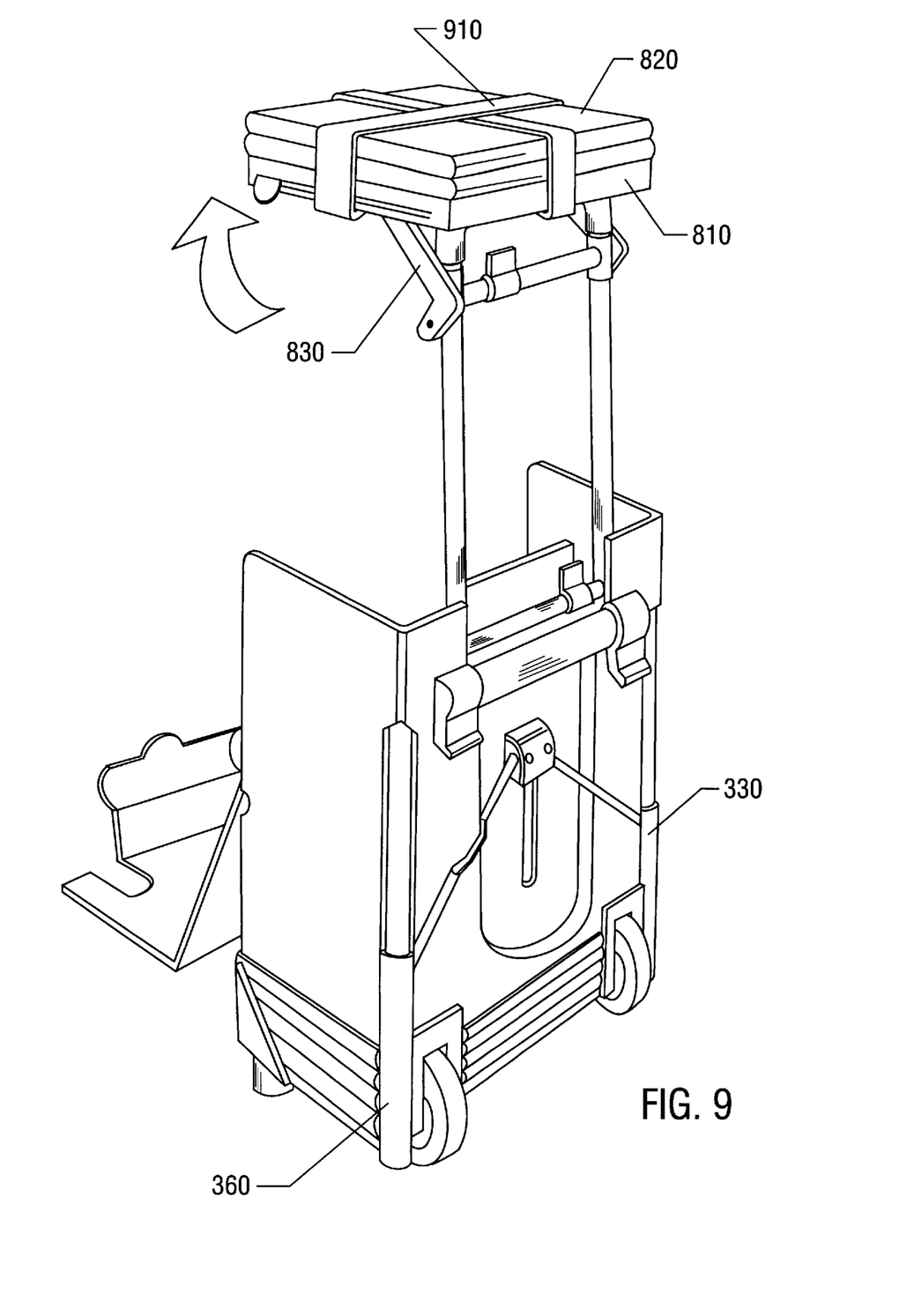
FIG. 9 illustrates an isometric rear and side view of the suitcase with the portable computer and tray located in an upright position.

FIG. 8 illustrates a tray 810 upon which a portable computer 820 is fastened. The tray 810 is slidably attached to the extensible transport member 150, and can be moved along the extensible transport member 150. The tray 810 is connected to the extensible transport member 150 by the pivoting arms 830. Once the tray 810 is locked into place near the top of the extensible transport member 150, it can be positioned into an upright position, as shown in FIG. 9. This is done by swiveling the pivoting arms 830 upwards until the tray 810 is upright and locked into place. The portable computer 820 is fastened to the tray 810 with the fastening belts 910, which are readily connectable via a conventional coupling, such as buckles, hookless fasteners, elastic belts with hooks, etc.

Figure 10:
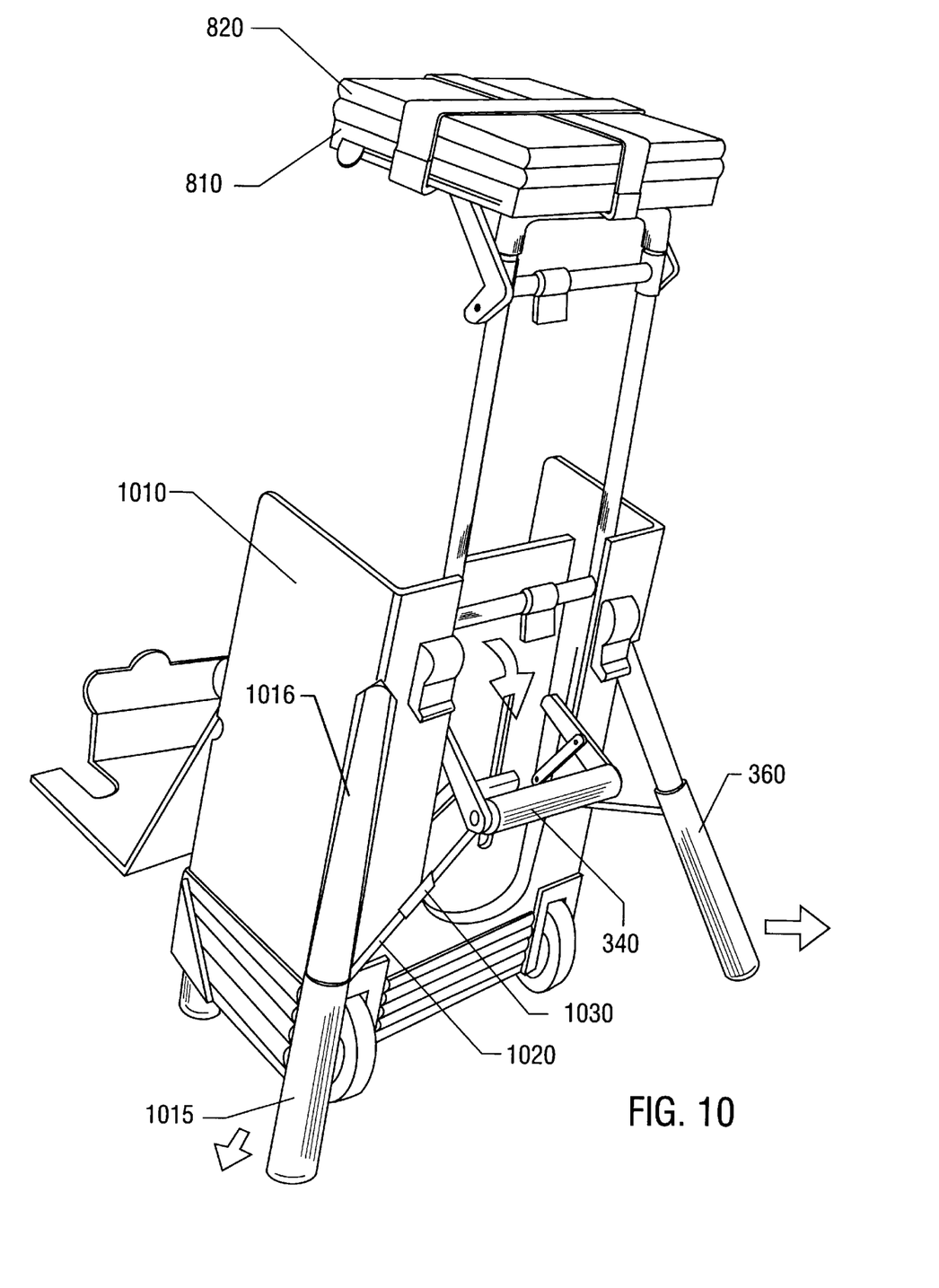
FIG. 10 illustrates an isometric rear and side view of the suitcase with an additional support member deployed.

FIG. 10 shows the suitcase 100 in a stabilized position. Once the tray 810 and the computer 820 are secured into an upright position, a base portion 1010 of the suitcase 100 should be stabilized. The base portion 1010 is stabilized by the support members 330, 360. The support members 330, 360 can be pulled out from their storage location and positioned such that the suitcase 100 is stabilized. Referring back to FIG. 9, the support members 330, 360 are shown retracted into a storage location. Returning back to FIG. 10, the support members 330, 360 effectively expand the support provided by the base portion 1010. Essentially, the area of support at the bottom of the base portion 1010 is expanded due to the support members 330, 360. This enhanced support offsets the instability created by the upward movement of the center of mass of the entire unit when the portable computer 820 is deployed. The support members 330, 360 are generally rod shaped, having a free end portion 1016 and a pivotal end portion 1015. The pivotal end portion 1015 captures the support members 330, 360 against the base 1010 but still allow the free end portion 1016 to be swung outwardly and engage the floor at a distance spaced from the base 1010.

The base portion 1010 also houses a footrest 340 that can be pulled out. The footrest 340 swivels outwards such that a user can place a foot upon it while using the computer 820. The footrest 340 is connected to the support members 330, 360 by two struts 1020 which have foldable elbows 1030. Therefore, part of the force exerted by the user's foot being placed upon the footrest 340 is transferred onto the support members 330, 360 via the struts 1020. Thus, the entire suitcase/workstation 100 is stable when the computer 820 is deployed and the user is using the computer 820.

Figure 11:
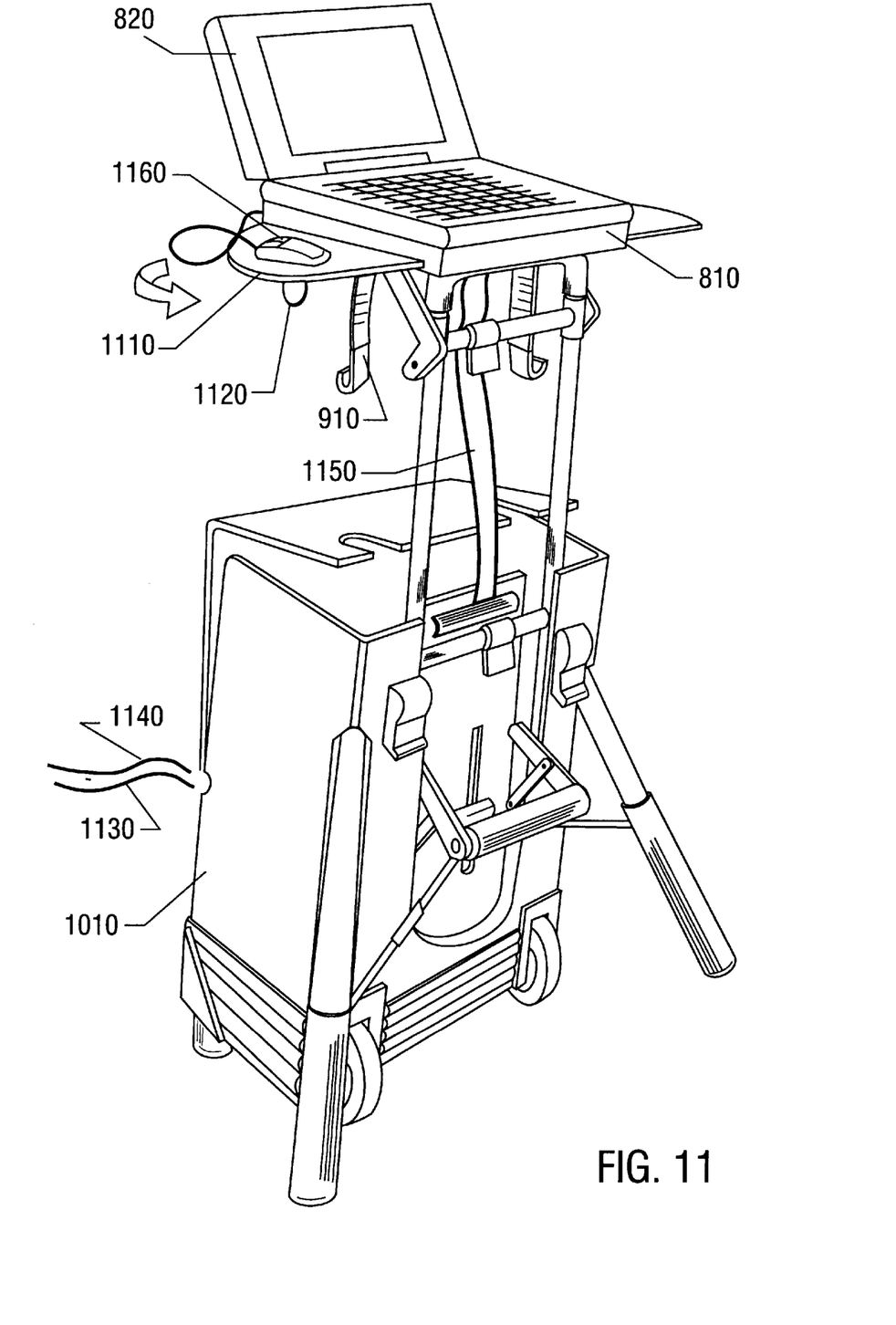
FIG. 11 illustrates an isometric rear and side view of the suitcase with the tray flaps deployed.

Turning now to FIG. 11, once the suitcase/workstation 100 is properly stabilized for computer use, the computer 820 can be unfastened by unlocking the fastening belts 910. There are two platforms 1110 that pivot out from within the tray 810. The platforms 1110 are swiveled out by pulling on the tabs 1120 on the edge of the platforms 1110. The platforms 1110 can be used for various computer peripherals, such as a mouse 1160, or for miscellaneous items such as paperwork.

The base portion 1010 also houses the devices which hold a power extension cord 1130 and a phone line extension cord 1140. These wires are retractable and are pulled out in order to adapt to the length that the user needs. A power adapter wire 1150 from the computer can be connected to one end of the power extension cord 1130. Also, one end of the phone line extension cord can be connected to the phone jack on the computer 820. At this point the suitcase 100 is transformed into a fully functional computer workstation.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A portable computer workstation, comprising:

a base portion including a plurality of walls arranged to form at least one enclosed compartment, and wherein at least one of said walls is moveable to provide access to the interior of said compartment;

a wheel system attached to said base portion;

a transport member having first and second end portions, said first end portion having a handle formed thereon, and said second end portion being coupled to said base portion, said transport member being moveable between a first and second position where said handle is adjacent said base portion in said first position, and said handle is spaced from said base portion in said second position; and a tray movably connected to said transport member and is adapted to receive and secure a portable computer to said tray, said tray being moveable between a first and second position where said tray is adjacent said handle in said first position, and said tray is adjacent said base portion and said tray and portable computer thereon is received by said compartment in said second position.

2. A portable computer workstation, comprising:

a base portion;

a wheel system attached to said base portion;

a transport member having first and second end portions, said first end portion having a handle formed thereon, and said second end portion being coupled to said base portion, said transport member being moveable between a first and second position where said handle is adjacent said base portion in said first position, and said handle is spaced from said base portion in said second position; and a tray movably connected to said transport member and is adapted to receive and secure a portable computer to said tray, said tray being moveable between a first and second position and fixable in a plurality of locations between said first and second positions and where said tray is adjacent said handle in said first position, and said tray is adjacent said base portion in said second position.

3. A portable computer workstation, comprising:

a base portion;

a wheel system attached to said base portion;

a transport member having first and second end portions, said first end portion having a handle formed thereon, and said second end portion being coupled to said base portion, said transport member being moveable between a first and second position where said handle is adjacent said base portion in said first position, and said handle is spaced from said base portion in said second position; and a tray movably connected to said transport member and is adapted to receive and secure a portable computer to said tray, said tray being moveable between a first and second position and fixable in a substantially horizontal disposition at a plurality of locations between said first and second positions so that said portable computer is supported in a working orientation and where said tray is adjacent said handle in said first position, and said tray is adjacent said base portion in said second position.

4. A portable computer workstation, comprising:

a base portion further comprising:

at least one support member movable between first and second positions, said support member first position defining a base portion footprint of a first pre-selected size, and said support member second position defining a base portion footprint of a second pre-selected size, larger than said first pre-selected size; and     a footrest coupled to said base portion and said support member, said footrest being moveable between first and second positions, and movement of said footrest between said first and second positions corresponds to movement of said support member between said first and second positions, said footrest being adapted to receive and support at least one foot of an operator in said second position; coupled to said support member;

a wheel system attached to said base portion;

a transport member having first and second end portions, said first end portion having a handle formed thereon, and said second end portion being coupled to said base portion, said transport member being moveable between a first and second position where said handle is adjacent said base portion in said first position, and said handle is spaced from said base portion in said second position; and a tray movably connected to said transport member and is adapted to receive and secure a portable computer to said tray, said tray being moveable between a first and second position where said tray is adjacent said handle in said first position, and said tray is adjacent said base portion in said second position.

5. The portable computer workstation of claim 4, including:

said wheel system being attached to said base portion adjacent a first end portion thereof, said wheel system being disposed to permit rolling movement of said base portion in a first direction; and     a second wheel system attached to said base portion adjacent said first end portion thereof, said second wheel system being disposed to permit rolling movement of said base portion in a second direction.

6. The portable computer workstation of claim 5, wherein said first and second directions are substantially orthogonally disposed.

7. A portable computer workstation, comprising:

a base portion including a plurality of walls arranged to form at least one enclosed compartment, and wherein at least one of said walls is moveable to provide access to the interior of said compartment;

at least one wheel attached to said base portion;

a transport member having first and second end portions, said first end portion having a handle formed thereon, and said second end portion being coupled to said base portion, said transport member being moveable between a first and second position where said handle is adjacent said base portion in said first position, and said handle is spaced from said base portion in said second position; and a tray movably connected to said transport member and is adapted to receive and secure a portable computer to said tray, said tray being moveable between a first and second position where said tray is adjacent said handle in said first position, and said tray is adjacent said base portion in said second position and said tray and portable computer therein are received by said compartment in said second position, said tray being fixable in a substantially horizontal disposition at said first position so that said portable computer is supported in a working orientation.

8. A portable computer workstation, comprising:

a base portion;

at least one wheel attached to said base portion;

a transport member having first and second end portions, said first end portion having a handle formed thereon, and said second end portion being coupled to said base portion, said transport member being moveable between a first and second position where said handle is adjacent said base portion in said first position, and said handle is spaced from said base portion in said second position; and a tray movably connected to said transport member and is adapted to receive and secure a portable computer to said tray, said tray being moveable between a first and second position and fixable in a plurality of locations between said first and second positions where said tray is adjacent said handle in said first position, and said tray is adjacent said base portion in said second position, said tray being fixable in a substantially horizontal disposition at said first position so that said portable computer is supported in a working orientation.

9. A portable computer workstation, comprising:

a base portion further comprising:

at least one support member movable between first and second positions, said support member first position defining a base portion footprint of a first pre-selected size, and said support member second position defining a base portion footprint of a second pre-selected size, larger than said first pre-selected size; and     a footrest coupled to said base portion and said support member, said footrest being moveable between first and second positions, and movement of said footrest between said first and second positions corresponds to movement of said support member between said first and second positions, said footrest being adapted to receive and support at least one foot of an operator in said second position; coupled to said support member;

at least one wheel attached to said base portion;

a transport member having first and second end portions, said first end portion having a handle formed thereon, and said second end portion being coupled to said base portion, said transport member being moveable between a first and second position where said handle is adjacent said base portion in said first position, and said handle is spaced from said base portion in said second position; and a tray movably connected to said transport member and is adapted to receive and secure a portable computer to said tray, said tray being moveable between a first and second position where said tray is adjacent said handle in said first position, and said tray is adjacent said base portion in said second position, said tray being fixable in a substantially horizontal disposition at said first position so that said portable computer is supported in a working orientation.

* * * * *